United States Patent

Boskovic

[11] Patent Number: 5,804,226
[45] Date of Patent: Sep. 8, 1998

[54] BUSHING FOR KNOCK OUT PIN AND REMOVABLE KNOCK OUT PIN ASSEMBLY

[76] Inventor: Borislav Boskovic, 2102 Bannockburn, Inverness, Ill. 60067

[21] Appl. No.: 760,658

[22] Filed: Dec. 9, 1996

[51] Int. Cl.$^6$ .................................................. B29C 45/40
[52] U.S. Cl. ................................. 425/436 RM; 249/67; 264/334; 425/185; 425/556
[58] Field of Search ...................................... 425/444, 556, 425/436 RM, 185, 192 R, 191, 589, 595; 264/334; 249/67, 68

[56] References Cited

U.S. PATENT DOCUMENTS

| | | | |
|---|---|---|---|
| 3,718,415 | 2/1973 | Felice | 425/444 |
| 3,914,086 | 10/1975 | Hujik | 425/437 |
| 3,930,778 | 1/1976 | Roncelli | 425/192 |
| 4,050,666 | 9/1977 | Van Tichelt | 249/68 |
| 4,929,170 | 5/1990 | Boskovic | 425/556 |
| 5,112,207 | 5/1992 | Pinsonneault | 425/192 R |
| 5,227,178 | 7/1993 | Rieker | 425/556 |
| 5,368,468 | 11/1994 | Boskovic | 425/556 |
| 5,451,156 | 9/1995 | Roncelli et al. | 425/192 R |

*Primary Examiner*—Jay H. Woo
*Assistant Examiner*—Iurie Schwartz
*Attorney, Agent, or Firm*—Lee, Mann, Smith, McWilliams, Sweeney & Ohlson

[57] ABSTRACT

A bushing for retaining a knock out pin and a removable knock out pin assembly utilizing that bushing. The bushing has a pin holding portion composed of upstanding flexible arms engagable with a knock out pin, each of the arms having a lug for engaging the knock out pin. A retention ring is formed on the bottom of the bushing, the ring having an outwardly-extending flange for engaging an aperture in a plastic mold. The knock out pin has opposite grooves for accommodating the lugs of the bushing, the pin being removable by rotating the pin 90° to disengage the lugs from the grooves so that the pin can be axially removed.

14 Claims, 1 Drawing Sheet

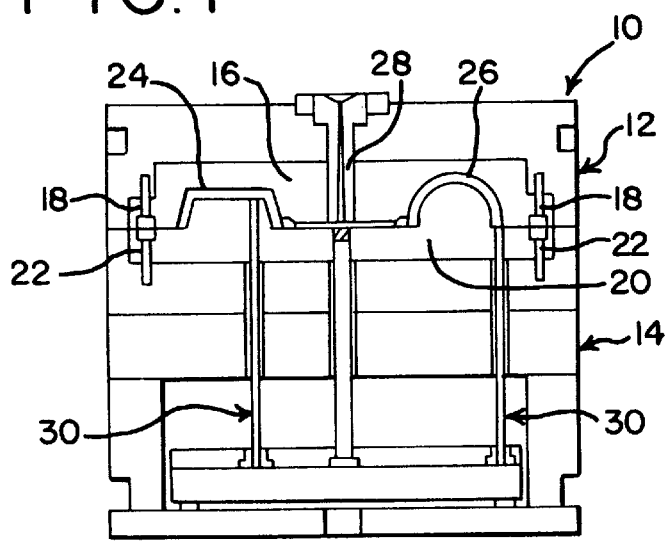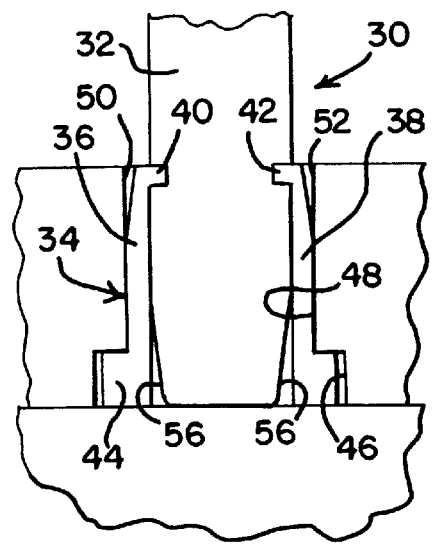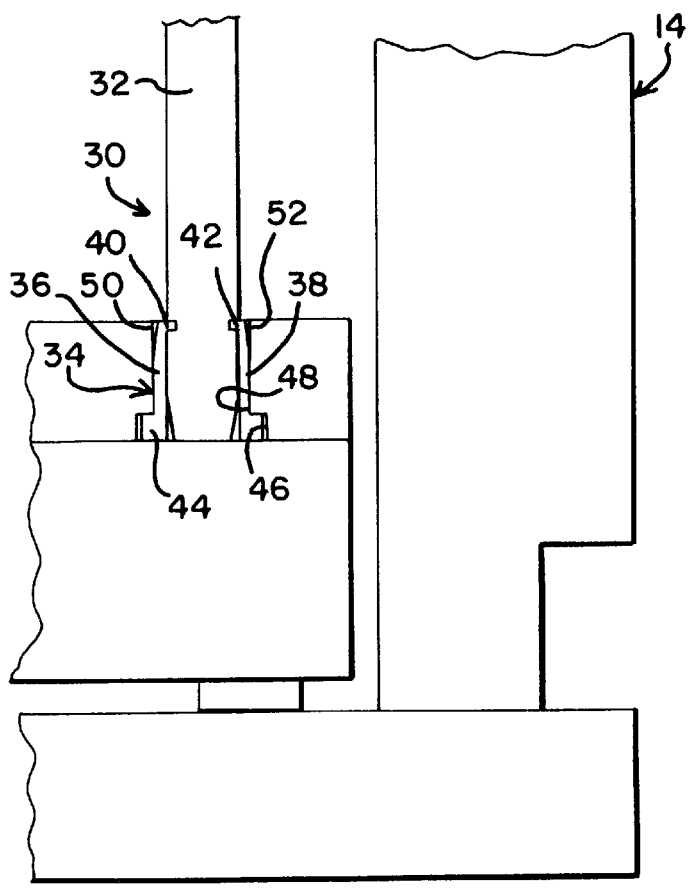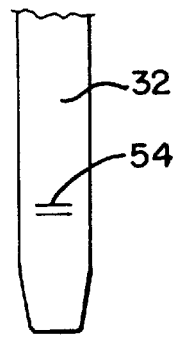

BUSHING FOR KNOCK OUT PIN AND REMOVABLE KNOCK OUT PIN ASSEMBLY

BACKGROUND OF THE INVENTION

This invention relates to plastic injection molds, and in particular to a bushing for retaining a knock out pin and a removable knock out pin assembly utilizing the bushing.

Knock out pins are used in plastic injection molds to remove, or therefore "knock out", parts from the mold when the mold is opened. A plastic injection mold typically consists of a core and a cavity, and the knock out pins are installed in the core in strategic locations for part removal.

In the case of a mold having interchangeable parts, it is often necessary to change the knock out pins as the mold parts are changed. Many such devices exist for that purpose, but these devices are quite complex and difficult to use, and require disassembly of part of the mold each time a knock out pin is removed. It therefore would be advantageous for a knock out pin to be readily removable from a mold without the need for disassembling any part of the mold to remove the pin.

SUMMARY OF THE INVENTION

The invention relates to a bushing for retaining a knock out pin in a plastic mold, as well as a removable knock out pin assembly utilizing the bushing. The bushing comprises a pin holding portion, with the pin holding portion including flexible means for engaging a knock out pin. The bushing also includes means for retaining the bushing in a plastic mold.

In accordance with the preferred form of the invention, the bushing includes a shank, with the pin holding portion being located at one end of the shank and the retaining means being located at an opposite end of the shank. The shank preferably comprises opposite arms, and the retaining means comprises a ring having a circumferential flange for installation in a conforming aperture in the plastic mold. The flexible means comprises flexible ends of the arms which carry grip members for engaging a knock out pin. Preferably, the grip members are lugs.

In the knock out pin assembly according to the invention, a knock out pin is installed in the bushing, with the knock out pin being engagable by the flexible arms. Preferably, the knock out pin includes opposite grooves which accommodate the lugs of the arms. When installed within a mold, the lugs are seated the grooves to retain the knock out pin in the mold. When the knock out pin is to be removed, the knock out pin is rotated 90° to disengage the lugs from the grooves, and then the pin is simply axially pulled from the mold.

BRIEF DESCRIPTION OF THE DRAWINGS

The invention is described in greater detail in the following description of an example embodying the best mode of the invention, taken in conjunction with the drawing figures, in which:

FIG. 1 is a cross-sectional view through a plastic injection mold, when closed, illustrating utilization of two of the removable knock out pin assemblies according to the invention, FIG. 2 is a greatly enlarged cross-sectional view of the lower right corner of the mold of FIG. 1, with the knock out pin being illustrated in elevation and the remaining parts in cross section, FIG. 3 is a further enlarged view of the knock out pin and its bushing illustrated in FIG. 2, and FIG. 4 is a partial elevational view of the knock out pin illustrated in FIG. 2, rotated 90° to illustrate the pin-holding grooves.

DESCRIPTION OF AN EXAMPLE EMBODYING THE BEST MODE OF THE INVENTION

Turning first to FIG. 1, a plastic injection mold is schematically illustrated in cross-section at 10. As is typical, the mold 10 comprises a cavity 12 a core 14. The cavity 12 includes a removable cavity plate 16 held in place in the cavity 12 by means of appropriate fasteners 18. Similarly, the core 14 includes a removable core plate 20 corresponding to the cavity plate 16 and also held in place by appropriate fasteners 22. When the mold 10 is closed as illustrated in FIG. 1, the engaging cavity plate 16 and core plate 20 form mold apertures 24 and 26 in which plastic parts are formed. Plastic is injected into the mold 10 via a nozzle 28 in a conventional fashion. The cavity plate 16 and the core plate 20 are removable and replaceable so that different plastic parts can be formed by the injection mold 10.

When the core 14 and the cavity 12 are separated, typically a series of knock out pins is used to assist removal of molded parts from the mold apertures 24 and 26. As illustrated in FIG. 1, a series of knock out pin assemblies 30 according to the invention are used for this purpose.

FIGS. 2 through 4 illustrate one of the knock out pin assemblies 30, with it being understood that each of the knock out pin assemblies 30 is similarly formed, and as many assemblies 30 are used as needed in the mold 10. As illustrated in FIG. 2, each of the knock out pin assemblies 30 comprises a knock out pin 32 and a bushing 34.

The bushing 34 includes an upstanding shank composed of opposite arms 36 and 38. The arms 36 and 38 collectively comprise means for holding the knock out pin 32, that including opposed grip members in the form of lugs 40 and 42 formed at the top of the respective arms 36 and 38. The bushing 34 is preferably made of metal, and the arms 36 and 38 are sufficiently flexible so as to be disengagable from the knock out pin 32, as explained below.

The bushing 34 includes a retaining ring 44 from which the arms 36 and 38 integrally extend. While the arms 36 and 38 are shown as rising directly from the ring 44, it will be evident that depending on the size of the bushing 34 the shank of the bushing may be cylindrical with the arms extending thereabove, so long as the arms are able to flex. The ring extends outwardly from the arms 36 and 38, forming a circumferential flange engagable in a similarly-shaped cylindrical aperture 46 formed in the core portion 14. The aperture 46 is formed at the bottom of a cylindrical bore 48, as illustrated. Therefore, the bushing 34, when installed in the bore 48, is retained permanently in place unless the core 14 is disassembled.

As illustrated, the arms 36 and 38 taper at their upper portions, forming respective gaps 50 and 52 between the arms 36 and 38 and the wall of the bore 48. The gaps 50 and 52 are sufficiently deep so as to allow the arms 36 and 38 to flex enough for the lugs 40 and 42 to be disengaged from the knock out pin 32, as explained below.

The knock out pin 32 is generally circular in cross-section, and is shaped and sized to fit within the bushing 34 between the arms 36 and 38. The lugs 40 and 42 engage opposite grooves 54 (FIG. 4) formed on opposite sides of the knock out pin 32. As illustrated, the grooves 54 extend only sufficiently to be engaged by the lugs 40 and 42. The remaining portions of the knock out pin 32 are not grooved.

The bottom of the knock out pin 32 includes a taper 56, which may circumferentially extend around the pin 32, or only in the regions beneath the grooves 54. When installed in the bushing 34, the knock out pin 32 is inserted with the taper 56 between the lugs 40 and 42, spreading the lugs 40 and 42 with the arms 36 and 38 in the gaps 50 and 52 as the knock out pin 32 is inserted. When the knock out pin 32 reaches the position shown in FIGS. 2 and 3, the retentative force of the arms 36 and 38 causes the lugs 40 and 42 to snap into the opposite grooves 54 to retain the knock out pin 32 in place. For removal, the knock out pin 32 is rotated approximately 90° from the orientation shown in FIGS. 2 and 3, until the grooves 54 are between the lugs 40 and 42. The arms 36 and 38 are therefore spread into the gaps 50 and 52, and the knock out pin 32 can be easily removed from the bushing 34 and replaced. Thus, multiple knock out pins 32 can be utilized with a single bushing 34 to accommodate changing of the core plate 20.

Various changes can be made to the invention without departing from the spirit thereof or scope of the following claims.

What is claimed is:

1. A bushing for retaining a knock out pin for a plastic mold, comprising
    a. a pin holding portion, said pin holding portion including flexible means for gripping a knock out pin to hold the knock out pin in place in said pin holding portion, and
    b. means for retaining the bushing in a plastic mold.
2. A bushing according to claim 1, in which said bushing includes a shank, said pin holding portion being located at one end of said shank and said retaining means being located at an opposite end of said shank.
3. A bushing according to claim 2, in which said shank includes opposite arms, and said retaining means comprises a ring having a circumferential flange.
4. A bushing according to claim 1, in which said flexible means includes opposed grip members for engaging a knock out pin, said grip members extending from opposite flexible arms spaced from one another to accommodate a knock out pin.
5. A bushing according to claim 4, in which said grip members comprise lugs.
6. A removable knock out pin assembly for a plastic mold, comprising
    a. a bushing, said bushing including
        i. a pin holding portion, said pin holding portion including flexible means for gripping a knock out pin to hold the knock out pin in place in said pin holding portion,
        ii. means for retaining the bushing in a plastic mold, and
    b. an elongated knock out pin, said pin being grippable by said flexible means and being removable from said pin holding portion by disengagement from said flexible means.
7. A removable knock out pin assembly according to claim 6, in which said bushing includes a shank, said pin holding portion being located at one end of said shank and said retaining means being located at an opposite end of said shank.
8. A removable knock out pin assembly according to claim 7, in which said shank includes opposite arms, and said retaining means comprises a ring having a circumferential flange.
9. A removable knock out pin assembly according to claim 6, in which said flexible means includes opposed grip members for engaging a knock out pin, said grip members extending from opposite flexible arms spaced from one another to accommodate a knock out pin.
10. A removable knock out pin assembly according to claim 9, in which said grip members comprise lugs.
11. A removable knock out pin assembly according to claim 9, in which said knock out pin includes opposite means for accommodating said grip members.
12. A removable knock out pin assembly according to claim 11, in which said means for accommodating comprises opposite grooves in said knock out pin.
13. A removable knock out pin assembly according to claim 12, in which said knock out pin is removable from said pin holding portion by means of rotation of said knock out pin about a central axis to disengage said grip members from said opposite grooves.
14. A removable knock out pin assembly according to claim 12, in which said grip members comprise lugs engaging said opposite grooves.

\* \* \* \* \*